UNITED STATES PATENT OFFICE.

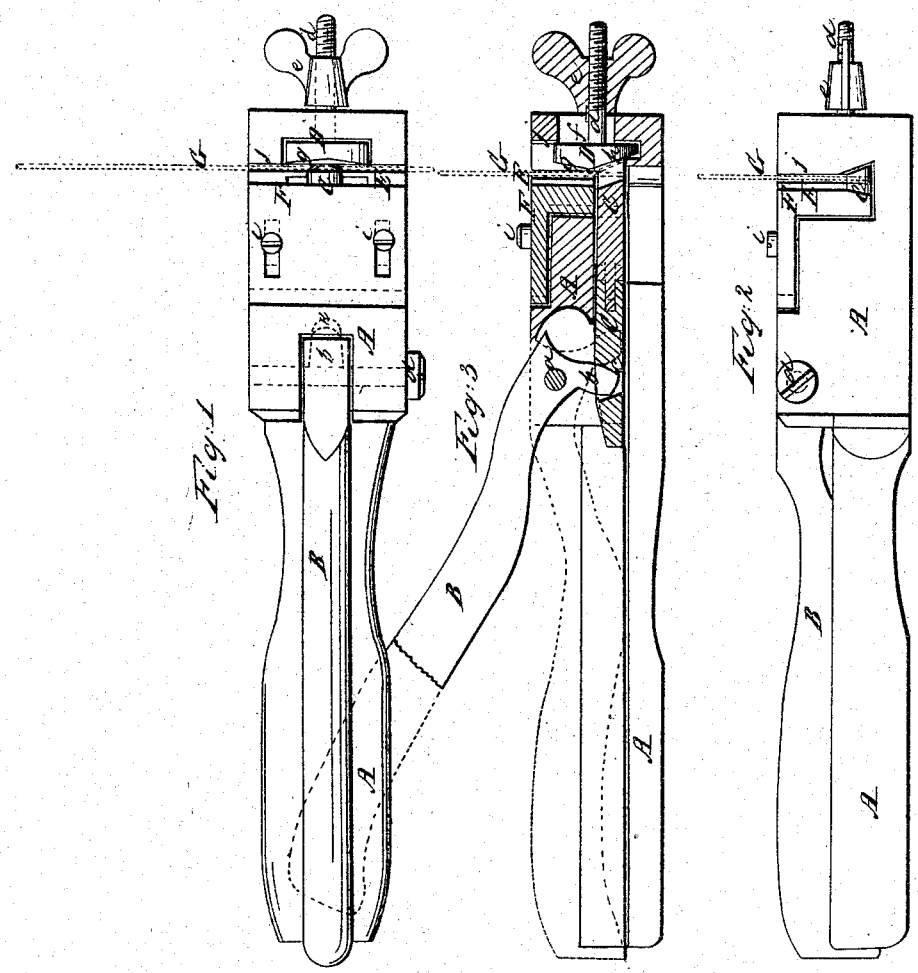

ABRAHAM CASEY, OF NEW YORK, N. Y.

SAW-SET.

Specification of Letters Patent No. 15,731, dated September 16, 1856.

*To all whom it may concern:*

Be it known that I, ABRAHAM CASEY, of the city, county, and State of New York, have invented a new and useful Improvement in Saw-Sets; and I do hereby declare that the following is a full, clear, and exact description of the same, reference being had to the accompanying drawings, forming part of this specification, in which—

Figure 1, is a plan, Fig. 2 a side view, and Fig. 3, a vertical longitudinal section of a saw set constructed after my invention.

Similar letters of reference in each of the several figures indicate corresponding parts.

The main object of my invention is to save the saw blade from being strained or bent and rendered untrue in performing the operation of setting the teeth to cut a broad kerf.

The nature of my said invention consists, 1st. In the combination and arrangement of the saw set block having a transverse kerf for the saw blade to be placed and confined in while its teeth are being set, bevel bolster for giving the desired set to the teeth, and punch for performing the operation of forcing the teeth up against the bolster, as presently described.

It consists, 2nd: In arranging the bolster on a screw pin which plays in a slot and has a clamping nut, whereby it is rendered variable to suit the set it is desired to give the teeth of the saw.

With these improvements, a very simple and convenient saw set is produced, in which the saw blade is provided with a square seat or shoulder to bear against while its teeth are being set, and thus saved from being strained or bent out of true, as commonly experienced when set with the saw sets at present in use owing to the blade not having any support.

To enable others skilled in the art to make and use my invention, I will proceed to describe its construction and operation.

A, represents the horizontal saw set stop; B, a lever by which the punch C, is operated. This lever has its fulcrum at $a$, and is connected with the punch by a jog or projection $b$, and slot $c$, as shown.

D, is the bolster, it is attached to a screw pin $d$ which has a clamping nut $e$, on its end, said pin working up and down in a slot $f$, formed in the end of the stock A. The bolster has two bevels $g$, $h$, on its face which serve for giving the set to the teeth of very fine and medium saws, and is made adjustable up and down by the pin $d$, and slot $f$, so as to serve for coarse saws, as will be made evident in describing the operation.

E, is the kerf in which the saw blade is placed while having its teeth set. This kerf extends entirely across the stock A and nearly to the base of the same, as represented.

F, is an adjustable plate varying the width of the kerf and thereby adjusting it to saws of any thickness. This plate is provided with set screws $i$, $i$, and after being adjusted is confined and made to firmly clamp the blade of the saw between the seat or shoulder $j$, of the stock, and itself.

G, is a saw blade, shown in red lines placed and confined in the kerf in all the figures of the drawing.

Operation: The saw set being adjusted to the condition shown in black in Fig. 3, the saw blade is placed in the kerf E, as shown, and clamped against the shoulder $j$, in a manner to be supported and saved from being strained &c., by shifting the plate F, from the position shown in black to that shown in red and then tightening the screws $i$, $i$,—this being done, the bolster, if the saw be medium fine, remains as shown in Fig. 3, or, if coarse, is raised more or less, according to the length of the tooth or the set it is desired the saw shall have; but, if very fine, the bolster is turned around so as to bring $g$, in the place of $h$, or vice versa. The lever B, and stock A, are now taken in the hand and pressed together like a pair of pincers are operated and consequently the punch is forced forward against the tooth to be set, and caused to drive it up against the bolster, which, owing to its bevel, gives it the proper set, as illustrated by dotted red lines in Figs. 2 and 3; and thus the operation proceeds until all the teeth of the saw are set.

What I claim as new and desire to secure by Letters Patent, is—

1. The combination and arrangement of the stock, A, having a transverse kerf E; bevel bolster D, and punch B, substantially as and for the purpose herein set forth.

2. I claim arranging the bolster on a turning screw pin which moves in a slot and has a clamping nut, substantially as and for the purpose herein described.

ABRAHAM CASEY.

Witnesses:
 J. W. COOMBS,
 O. D. MUNN.